United States Patent [19]

Davies et al.

[11] Patent Number: 5,710,205
[45] Date of Patent: Jan. 20, 1998

[54] COMPOSITION OF FLUOROPOLYMERS

[75] Inventors: Mark Davies, Yarm; Paul Martin Hatton, Fullwood, both of United Kingdom

[73] Assignee: Imperial Chemical Industries PLC, United Kingdom

[21] Appl. No.: 618,391

[22] Filed: Mar. 19, 1996

Related U.S. Application Data

[63] Continuation of Ser. No. 240,749, filed as PCT/GB93/01690, Aug. 10, 1993, abandoned.

[30] Foreign Application Priority Data

Sep. 10, 1992 [GB] United Kingdom .................... 9219140

[51] Int. Cl.[6] ................................................ C08L 81/00
[52] U.S. Cl. .................... 524/502; 524/609; 525/133; 525/179; 525/189
[58] Field of Search .................... 525/133, 179, 525/189; 524/502, 609

[56] References Cited

U.S. PATENT DOCUMENTS

| T952,005 | 11/1976 | Attwood et al. | 260/900 |
| 4,703,076 | 10/1987 | Mori | 524/420 |
| 5,093,403 | 3/1992 | Rau et al. | 524/404 |
| 5,244,975 | 9/1993 | Asai et al. | 525/189 |

FOREIGN PATENT DOCUMENTS 2531404  2/1976  Germany.

*Primary Examiner*—Helen Lee

[57] ABSTRACT

A wear-resistant solid fluoropolymer composition, e.g. of homo- and copolymers of tetrafluoroethylene (TFE), which has an extremely low coefficient of friction in dry sliding contact with metal, without the application of additional fluid lubricant, which composition comprises: a) a fluoropolymer, b) a poly(arylene sulphide) and c) another high aromatic polymer; and a process for preparing the foregoing solid fluoropolymer composition.

10 Claims, No Drawings

COMPOSITION OF FLUOROPOLYMERS

This is a continuation of application Ser. No. 08/240,749 filed on Aug. 12, 1994, now abandoned which is a 371 of PCT/GB93/01690.

The present invention relates to a wear-resistant composition comprising polymeric fillers and at least one fluoropolymer.

It is well-known in the art that fluoropolymers, such as homo- and copolymers of tetrafluoroethylene (TFE), have outstanding chemical and physical properties, in particular an extremely low coefficient of friction in dry sliding contact with metal, which make them ideal components in situations which require operation with moving loaded contact, e.g. for shaft bearings or piston rings, under dry conditions, ie without the application of additional fluid lubricant, and/or where the component is required to be as maintenance free as possible over its lifetime under such dry conditions. Examples of these include applications in domestic or commercial machinery (including automotive and/or hydraulic machinery). Such factors have led to the rapid increase of the use of fluoropolymer compositions in such applications. However, the compositions known hitherto tend to suffer from a disadvantageously high wear rate.

During dry sliding contact with a smooth metallic surface such fluoropolymer compositions form a film on the metal surface, and it is this film which dictates the interfacial tribological (frictional and wear) behaviour which is observed.

The film takes a finite sliding distance to equilibrate (known as the "break-in period"), and during break-in the friction and wear rate can each be orders of magnitude higher than at steady state. If the break-in period itself is considerable, the wear during the break-in period can form a significant part of the total.

A reduction in the break-in period would clearly offer an advantage.

It will be seen from the foregoing that there is a need for a fluoropolymer composition which has in particular the combination of a) an extremely low steady state coefficient of friction in dry sliding contact with metals, together with b) a very short break-in period before the steady state coefficient of friction and wear rate is achieved.

Surprisingly, we have now found fluoropolymer composition comprising polymeric fillers which combines the above advantageous properties, and which make them ideal materials for the above mentioned special applications.

Accordingly, the present invention provides a solid fluoropolymer composition which comprises:

a) a fluoropolymer, b) a poly(arylene sulphide) (hereinafter a PS) and c) another high aromatic polymer (hereinafter an HAP).

When used herein HAP means any polymer, at least 50 wt. %, preferably at least 65 wt. % and in particular 80 wt. % of which is made up of aromatic moieties.

Together with a very short break-in period and low steady state coefficient of friction and wear rate, the present fluoropolymer composition has excellent resistance to compression creep.

Such materials typically comprise:

a) a polymer main chain of aromatic diradicals, such as phenylene, in particular 1,4-phenylene, b) linked by functional groups, such as oxy, carbonyl, sulphonyl sulphonyloxy, amino and imino, and mixtures thereof.

Suitable compositions of the present invention comprise up to 40 vol. % of PS, preferably up to 30 vol. %, in particular 2 to 20 vol. % , and up to 30 vol. %, in particular 2 to 20 vol. %, and up to 30 vol. % of HAP, preferably up to 20 vol. %, in particular 1 to 10 vol. %, (all vol. % herein are relative to the total composition).

Within the above ranges, the PS and HAP may suitably be present in a volume ratio in the range of from 5:1 to 1:2, e.g. 9:2 to 2:3, preferably 4:1 to 1:1.

The fluoropolymer content of the fluoropolymer composition of the present invention may be as low as 30 vol. %, e.g. as low as 50 vol. %, preferably 60 to 90 vol. %, and in particular 70 to 97 vol. %.

The exact proportions may of course be adjusted by routine trial to achieve the desired balance of frictional and wear properties for any given application. We have found that the proportions referred to in particular above combine an extremely low steady wear rate and low steady state coefficient of friction in dry siding contact, with a short break-in period.

The fluoropolymer content of the composition may consist of one or more fluoropolymers, often of one. This depends however on the desired properties of the composition.

The or each fluoropolymer will typically comprise repeat units derived from at least one fluoroolefin and, optionally, at least one olefinically unsaturated monomer which is not a fluoroolefin.

Such fluoropolymers may be prepared by conventional fluoropolymer dispersion or suspension polymerisation processes.

Typically the fluoropolymer comprises a) 30–100 weight % (e.g. 50–100 weight %) of units derived from the fluoroolefin, and b) 0–70 weight% (e.g. 50–0 weight %) of other units (ie not derived from a fluoroolefin).

The fluoroolefin is broadly defined as an olefin having at least one fluorine atom substituent. Preferably the fluoroolefin is a perhaloolefin in which all the hydrogen atoms of the olefin are substituted with fluorine atoms and optionally other halogen atoms.

From the point of view of ease of production and resulting polymer properties fluoroolefins having 2 or 3 carbon atoms are preferable.

Examples of such fluoroolefins include a) fluoroethylenes such as $CF_2=CF_2$, $CH_2=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$; and b) fluoropropylenes such as $CF_3CF=CF_2$, $CF_3CF=CHF$, $CF_3CH=CF_2$, $CF_nCH=CH_2$, $CF_nCH=CH_2$, $CF_3CF=CHF$, $CHF_2CH=CHF$, and $CF_3CH=CH_2$.

Of the fluoroethylenes and fluoropropylenes listed above tetrafluoroethylene ($CF_2=CF_2$) ("TFE"), chlorotrifluoroethylene ($CClF=CF_2$) ("CTFE"), vinylidene fluoride ($CH_2=CF_2$) ("VDF"), and hexafluoropropylene ($CF_2=CFCF_3$) ("HFP") are particularly preferred.

Examples of non-fluoroolefins as comonomers include, particularly, perfluoro(alkyl vinyl ethers) ("PAVE's").

Examples of such ethers include perfluoro(propyl vinyl ether) ("PPVE"), and perfluoro(alkyl dioxoles) such as perfluoro(2,2-dimethyl-1,3-dioxole) ("PDD").

In principle the composition of the present invention may comprise any type of fluoropolymer; however, the advantages afforded by its use are more significant for non-melt processable fluoropolymers.

These include polymers such as PTFE (homopolymer), or copolymers of TFE with monomers selected from other fluoroethylenes. Such compositions have to be produced by sintering granulates or coagulated dispersions.

The invention may however also advantageously use melt-processable types of fluoropolymers, e.g. melt-processable copolymers of TFE with monomers selected from:

a) higher perfluoro α-olefins of 3 to 10 carbon atoms (particularly HFP) and/or b) perfluoroalkyl vinyl ethers of 3 to 10 carbons (particularly PPVE).

Copolymers of TFE/PPVE having 2 to 5 weight % PPVE (e.g. 2 to 4 weight % PPVE, typically 3 weight %) are also useful.

The fluoropolymer may thus e.g. be PTFE, PTFE-HFP copolymer, polyCTFE, or a TFE-PAVE copolymer.

Examples of such fluoropolymers include, preferably, PTFE, in particular Fluon G163, G580, G108 or G190 (trade mark, ICI).

The fluoropolymer(s) in the composition precursor used to prepare the composition, e.g. by sintering or melting the fluoropolymer(s), will conveniently be in granular or coagulated dispersion form, and depending on the type of the fluoropolymer(s), the composition will comprise an unsintered granulate or a particulate sinter of the fluoropolymer (s), and/or melted matrix.

Fluoropolymer(s), especially PTFE, with a mean particle size which is less than 60µ, e.g. 10 to 50µ, in particular 15 to 35µ will be suitable.

The arylene moiety in the PS is often phenylene, in particular 1,4-phenylene.

The PS may be linear or branched-chain and may be any PS, irrespective of the route by which it may have been prepared or processed.

The main PS of interest in the compositions of the present invention is one based on poly(1,4-phenylene sulphide), whether linear or branched-chain.

Examples of HAP's which may be used in the present compositions include poly(arylene etheretherketone) PEEK), poly(arylene etherketone) (PEK) and poly(arylene etherether ketone ketone) (PEEKK), and poly (arylenepropylene-aryleneetherether ketone) (PEDEK), and mixtures thereof.

Examples of HAP's which may be used in the compositions of the present invention also include poly(arylene etherethersulphone) (PEES), poly(arylene ethersulphone) (PES), poly(arylenepropylenearylene etherether sulphone) (PEDES), and mixtures thereof.

Examples of HAP's which may be used in the compositions of the present invention further include polyimide (PI), polyamideimide (PAI), polyetherimide (PEI), polyimidesulphone (PIS), poly(arylene oxide) (PO), poly(arylene ketone), poly(arylene sulphone) (PS), poly(arylene sulphone) block copolymers, and polybenzimidazole, and mixtures thereof.

Mixtures of all the foregoing classes of HAP's may be used.

The arylene moiety in the foregoing HAP's is often phenylene, in particular 1,4-phenylene.

The HAP may be linear or branched-chain in the composition of the present invention.

The HAP's of greatest interest among the foregoing HAP's are PI, PEEK and PEI, in particular those based on 1,4-phenylene.

These HAP's may also be linear or branched-chain.

The PS and HAP will typically be incorporated into the preparative precursor of the composition of the present invention as a particulate solid.

Each will thus often be present in the composition as a particulate filler in a sintered or melted matrix of fluoropolymer(s), depending on the physical properties of the latter.

The PS and HAP particles may range in mean size from 5 to 80µ, e.g. 10 to 60µ, in particular 20 to 50µ.

The most suitable size, depending on the nature of the material end the desired properties of the composition, may be determined by routine trial.

Most forms of the PS and most of the foregoing HAP's will be present in the composition of the present invention in a form which has been heat treated.

The mutual addition and initial blending is typically made at a temperature of usually 0° to 100° C. (e.g. 10° to 70° C., particularly 15° to 50° C.).

The mixture is then held at a temperature (or varying temperature range) typically within the range 200° C.–400° C.

The temperature and time period and the order and timing of component additions for the thermal treatment is usually specific to and critical for each component, and e.g. the temperature may vary outside the above range, and the time may vary from "zero time", ie no dwell at "on temperature", to 24 hours or more at the necessary temperature or temperature range, and/or other composition components added subsequently to the heat treatment.

In the case of the PS, for example, the procedure may involve dry blending the fluoropolymer(s) and PS together, heat treating the blend for up to 24 hr., followed by remixing prior to blending with the HAP.

In certain cases, e.g. where the HAP is PI, all the components may as an alternative be initially dry mixed and then heat treated together, followed by comminution prior to fabrication.

Blending may be carried out conventionally, e.g. in a Henschel mixer, a tumble mixer or a Littleford blender, or through a hammer mill.

Accordingly, the present invention provides a process for preparing the foregoing solid fluoropolymer composition which comprises in any feasible order a) dry blending the components as particulates, and b) optionally, heat treating the poly(1,4-phenylene sulphide) and/or the high aromatic polymer, and then c) heating the blend to a temperature or varying temperature range sufficient to sintered or melted the fluoropolymer(s) to form a matrix of fluoropolymer(s).

In addition to conventional additives for such a fluoropolymer composition, such as pigments and process aids, the composition may comprise additives known to confer a good steady state wear rate in dry sliding contact.

Examples include any of the following or any combination thereof, as up to 50 vol. % of the composition, e.g. up to 25 vol. %, preferably up to 10 vol. %:

carbon such as carbon fibre and powder, graphites (including electrographitised carbon and flaky graphite, the latter e.g. having a size of less than 300 mesh and/or containing more than 95 wt. % fixed carbon, and coke flours;

glass fibre and powder;

metal powders, such as stainless steel, nickel and bronze powders;

ceramic fibres and powders;

metal chalcogenides, such as molybdenum disulphide and aluminium hydroxide/hydrated aluminium oxide fibre and powder;

calcium fluoride; and siliceous fillers, such as wollastonite (calcium metasilicate), aluminium silicate and mica.

The present invention is now illustrated by reference to the following Example.

EXAMPLE

All the PTFE compositions prepared and evaluated and their components are listed in Table 1 below.

All were based on Fluon grade G163 (trade mark, ICI) PTFE, which in its unprocessed form is a granular powder with an average particle size of 25μ.

The compositions were prepared by dry blending of the components as particulates in a Henschel mixer.

Each composition is heat treated after the initial blending for 8 to 24 hr. at 290° to 320° C., and then reblended before subsequent conventional sintering into discs of thickness 5 mm.

The discs were then machined into square prisms of 5 mm side for frictional and wear evaluation.

TABLE 1

| Composition | PS vol. % | HAP | vol. % |
| --- | --- | --- | --- |
| 1 | 15 | PI | 5 |
| 2 | 8 | PI | 2 |
| 3 | 5 | PI | 5 |
| 4 | 5 | PEEK | 5 |
| 5 | 30 | PI | 10 |

In Table 1:

the PS is Ryton P4 (trade mark, Phillips Petroleum);

the PI is polyimide Lenzing P84 (trade mark, Lenzing AG); and the PEEk used is Victrex 150P (trade mark, ICI), c.35μ.

The frictional and wear tests were performed using an apparatus which is essentially that described in Surface and Interface Analysis, 18, 1992, 303–305. This uses a pin on EN8 steel or LM24 aluminium under dry conditions at room temperature.

The apparatus for such a test comprises a pivoted lever arm bearing the test specimen near one end.

The specimen is biased into normal contact with the edge face of a rotating metal disc (here of EN8 steel) by a constant load applied to the other end of the lever arm.

Periodically the rotating disc is stopped, the specimen is removed, the mass loss of the specimen (due to wear at the contact surface with the disc) is determined. The test procedure is then resumed, optionally until the specimen is fully worn away.

Prior to the present testing the steel counterfaces were re-finished to a roughness of 0.1 μm Ra, and the specimens and counter faces were thoroughly degreased.

The speed of rotation of the steel ring was set so as to achieve an interfacial sliding speed of 1 m.s–1. a load of 1 mPa was applied continuously during sliding.

The specific wear rate was plotted as a function of time, hence determining when a steady state. The friction coefficient μ was also determined during these tests.

For each composition, four independent tests were carried out simultaneously, to produce the mean values in Table 2

TABLE 2

| Composition | Steady state Wear Rate (m3 · Nm−1 × $10^{-16}$) | Friction Coefficient μ | Break-in Period km |
| --- | --- | --- | --- |
| 1 | 2.1 | 0.24 | 5 |

(error ± 15%)

The compositions were found to have a short break-in period, which clearly offers the advantages set out hereinbefore over the related compositions known hitherto.

We claim:

1. A solid fluoropolymer composition which comprises:
    a) polytetrafluoroethylene (PTFE),
    b) a poly(arylene sulphide) and
    c) another aromatic polymer, at least 50 wt. % of which is made up of aromatic moieties linked by functional groups such as oxy, carbonyl, sulphonyl, sulphonyloxy, amino, imino and mixtures thereof and wherein the PTFE is present as a sintered matrix and wherein a mixture of at least the PTFE and the poly(arylene sulphide) have been subjected to a heat treatment within the temperature range from 200° C. to 400° C. prior to sintering and wherein the PTFE provides at least 30 vol. % of the composition, the poly(arylene sulphide) provides up to 40 vol. % of the composition and the aromatic polymer provides up to 30 vol. % of the composition;

and wherein the volume ratio of the poly(arylene sulphide) to the aromatic polymer is in the range of from 5:1 to 1:2.

2. A composition according to claim 1 wherein at least 80 wt. % of the aromatic polymer is made up of aromatic moieties.

3. A composition according to claim 1 wherein the aromatic polymer comprises
    a) a linear or branched polymer main chain of 1,4-phenylene aromatic diradicals,
    b) linked by oxy, carbonyl, sulphonyl, sulphonyloxy, amino and imino, and mixtures thereof, and the poly(arylene sulphide) is a linear or branched-chain poly(1,4-phenylene sulphide).

4. A composition according to claim 3 which comprises 2 to 20 vol. % of linear or branched-chain poly(1,4-phenylene sulphide), 1 to 10 vol. % of aromatic polymer, and 70 to 97 vol. % of PTFE relative to the total composition, and the poly(1,4-phenylene sulphide) and the aromatic polymer are present in a volume ratio in the range of from 4:1 to 1:1.

5. A composition according to claim 1 wherein the poly (arylene sulphide) and the aromatic polymer are present in the composition as a particular filler with particles of mean size from 20 to 50μ in a sintered or melted matrix of fluoropolymer(s).

6. A composition according to claim 1 wherein the sintered matrix is prepared from a PTFE with a mean particle size of 15 to 35μ.

7. A composition according to claim 1 wherein the aromatic polymer is a polyimide, polyetherimide, or a poly (arylene etheretherketone), wherein the aromatic moieties of said polymer comprise 1,4-phenylene moieties, or a mixture thereof.

8. A composition according to claim 1 wherein up to 10 vol. % of the compositions consists of an additive which is carbon; glass fibre or powder; metal powder; ceramic fibres and powders; metal chalcogenide; calcium fluoride; or a siliceous filler, or any combination thereof.

9. A process for preparing a composition according to claim 1 which comprises
   a) dry blending the PTFE and the poly(arylene sulphide); as particulates.
   b) heat treating the PTFE and the polyarylene sulphide;
   c) adding the aromatic polymer thereto; and
   d) heating the blend to a temperature or varying temperature range sufficient to sinter the PTFE to form a matrix of non-melt processable fluoropolymer.

10. A process for preparing a composition according to claim 1 which comprises:
    (a) dry blending the PTFE, the poly(arylene sulphide) and the aromatic polymer as particulates;
    (b) heat treating the blend to a temperature within the range of 200° C. to 400° C.; and
    (c) heating the blend to a temperature or varying temperature range sufficient to sinter the PTFE to form a matrix of non-melt processable fluoropolymer.

* * * * *